United States Patent
Ruhlman

[11] Patent Number: 5,857,386
[45] Date of Patent: Jan. 12, 1999

[54] PIVOT-ARM OVERTRAVEL IN A MOTION TRANSMITTING REMOTE

[75] Inventor: David L. Ruhlman, Macomb, Mich.

[73] Assignee: Teleflex Incorporated, Plymouth Meeting, Pa.

[21] Appl. No.: 754,627

[22] Filed: Nov. 21, 1996

[51] Int. Cl.⁶ .................................. F16C 1/10; F16C 1/22
[52] U.S. Cl. .................................. 74/502.4; 74/501.5 R; 74/500.5; 74/502; 74/502.6; 292/171; 292/DIG. 62
[58] Field of Search ........................... 74/500.5, 501.1 R, 74/502, 502.4, 502.5, 502.6, 480 B, 480 R; 292/171, DIG. 62, DIG. 25

[56] References Cited

U.S. PATENT DOCUMENTS

| | | | |
|---|---|---|---|
| 4,448,090 | 5/1984 | Carre et al. | 74/501.5 R |
| 4,580,455 | 4/1986 | Buegelsdyk et al. | 74/500.5 X |
| 4,599,912 | 7/1986 | Barnard et al. | 74/500.5 |
| 4,682,760 | 7/1987 | Baumgarten . | |
| 4,875,384 | 10/1989 | Hirayama et al. | 74/500.5 |
| 4,998,447 | 3/1991 | Feichtiger et al. . | |
| 5,076,114 | 12/1991 | Moody . | |
| 5,131,288 | 7/1992 | Barlas | 74/501.5 R X |
| 5,161,428 | 11/1992 | Petruccello . | |
| 5,377,556 | 1/1995 | Byrnes . | |
| 5,595,420 | 1/1997 | Rogers | 74/502 X |

*Primary Examiner*—Charles A. Marmor
*Assistant Examiner*—Scott Lund
*Attorney, Agent, or Firm*—Howard & Howard

[57] ABSTRACT

A motion transmitting remote control assembly (10 and 110) comprising a flexible motion transmitting core element for transmitting motion and a conduit for movably supporting said core element along a longitudinal axis. An adjustment means allows a change in the length of one of the core element and the conduit along the longitudinal axis thereof. The assembly is characterized by the adjustment means including a support member (26, 126) and a rotary member (30) supported by the support member (26, 126) at a support axis for rotation about the support axis in response to the change in the length to thereby minimize the longitudinal length of the adjustment means. A spring (32) interacts between the support member (26, 126) and the rotary member (30) for resisting the rotation of the rotary member (30) relative to the support member (26, 126). A cam element (34) coacts with a cam surface (36) in the rotary member (30) for rotating the rotary member (30) in response to the change in the length.

10 Claims, 2 Drawing Sheets

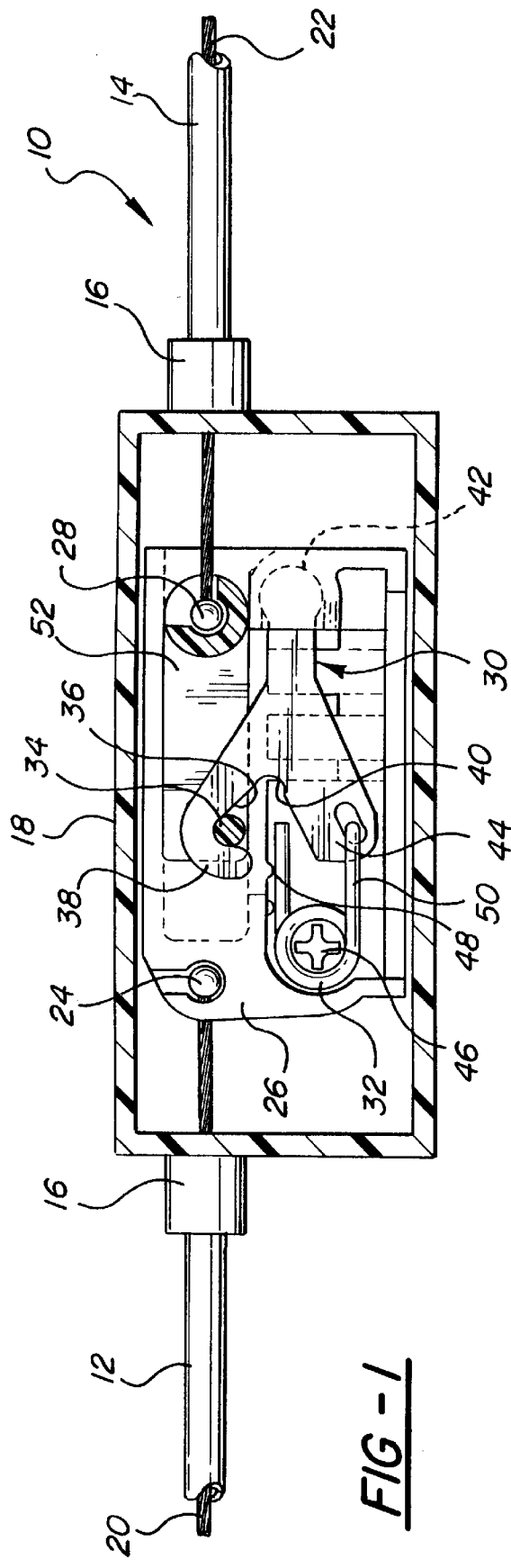
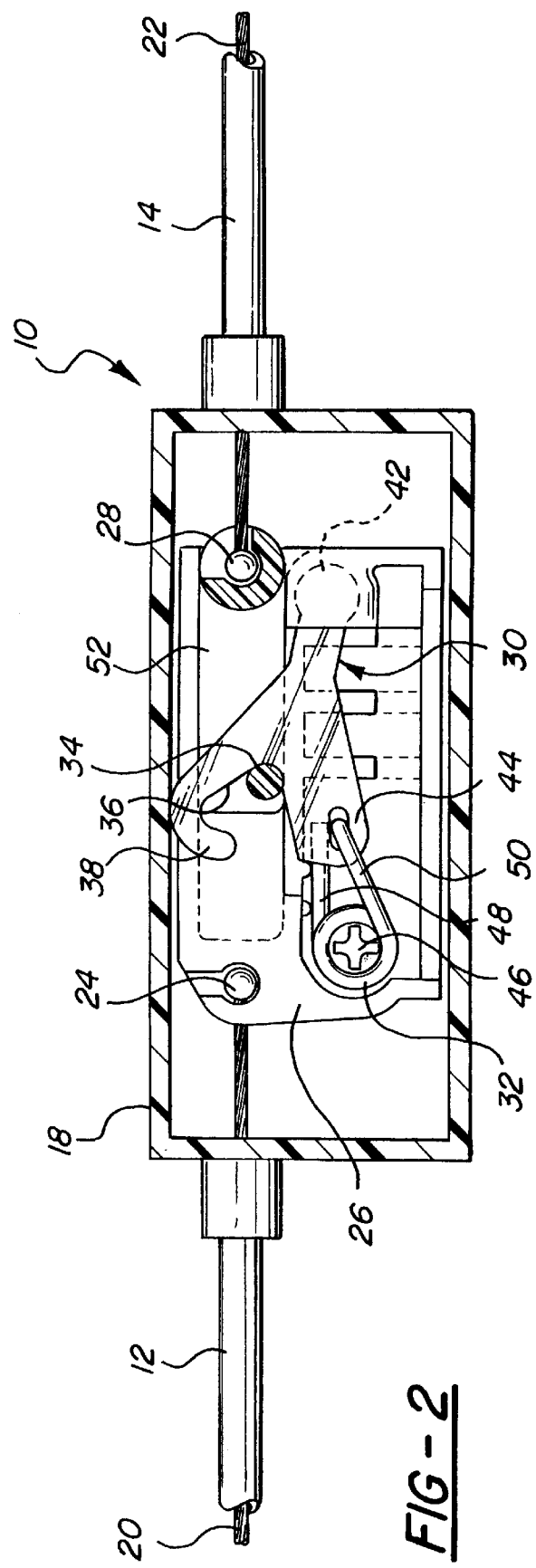
FIG-1
FIG-2

5,857,386

PIVOT-ARM OVERTRAVEL IN A MOTION TRANSMITTING REMOTE

TECHNICAL FIELD

The subject invention relates to a motion transmitting remote control assembly of the type for transmitting motion along a curved path by a flexible motion transmitting core element movably supported by a conduit.

BACKGROUND OF THE INVENTION

Remote control assemblies of the type to which the subject invention applies are used extensively in automotive vehicles for adjusting vents, mirrors, throttle controls, and various other devices. The overall length of such assemblies frequently vary during the installation process. Once installed, it is frequently necessary for the length of the core element or the conduit to change. More specifically, during the operation it frequently occurs that the input control member can be moved a greater distance than the output control member, in which case the conduit or core element must adjust in length to accommodate the overtravel. For example, a door handle on a vehicle may impart 30 millimeters of travel to a core element to move a door latch but wherein the movement of the door latch is limited to only 25 millimeters.

Adjustment mechanisms are known to the art which accommodate the change in the length or overtravel of either the core element or the conduit, the conduit length may include the length of a fitting or ferrule or other equivalent support structure. Such mechanisms generically include a spring which acts longitudinally along the assembly which consumes a length of the assembly. Such an assembly for adjusting the length of the core element is disclosed in U.S. Pat. No. 5,377,556 granted Jan. 3, 1995 and assigned to the assignee of the subject invention. Such an assembly for adjusting the length of the conduit is disclosed in U.S. Pat. No. 5,161,428 granted Nov. 10, 1992 and assigned to the assignee of the subject invention. It is frequently necessary to minimize the length occupied by the length adjustment mechanism.

SUMMARY OF THE INVENTION AND ADVANTAGES

A motion transmitting remote control assembly comprising a flexible motion transmitting core element for transmitting motion, a guide means for movably supporting the core element along a longitudinal axis and an adjustment means for allowing a change in the length of one of the core element and the guide means along the longitudinal axis. The assembly is characterized by the adjustment means including a support member and a rotary member supported by the support member at a support axis for rotation about the support axis in response to the change in the length.

The invention also provides a method for allowing a change in the length of one of a core element and a conduit supporting the core element along a longitudinal axis in a motion transmitting remote control assembly comprising the steps of converting the change in length along the longitudinal axis to rotary motion and controlling the rotary motion.

The subject invention therefore provides such a remote control assembly with an adjustment mechanism for adjusting the length of the core element or the conduit within a minimum distance along the length of the assembly. In other words, the adjustment means accommodates the overtravel caused by unequal input and output requirements.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view, partially in cross section, of a first embodiment showing the fully retracted or minimum length position;

FIG. 2 is a view like FIG. 1 but showing the fully extended position;

DETAILED DESCRIPTION OF THE PREFERRED EMBODIMENT

Figure 3:
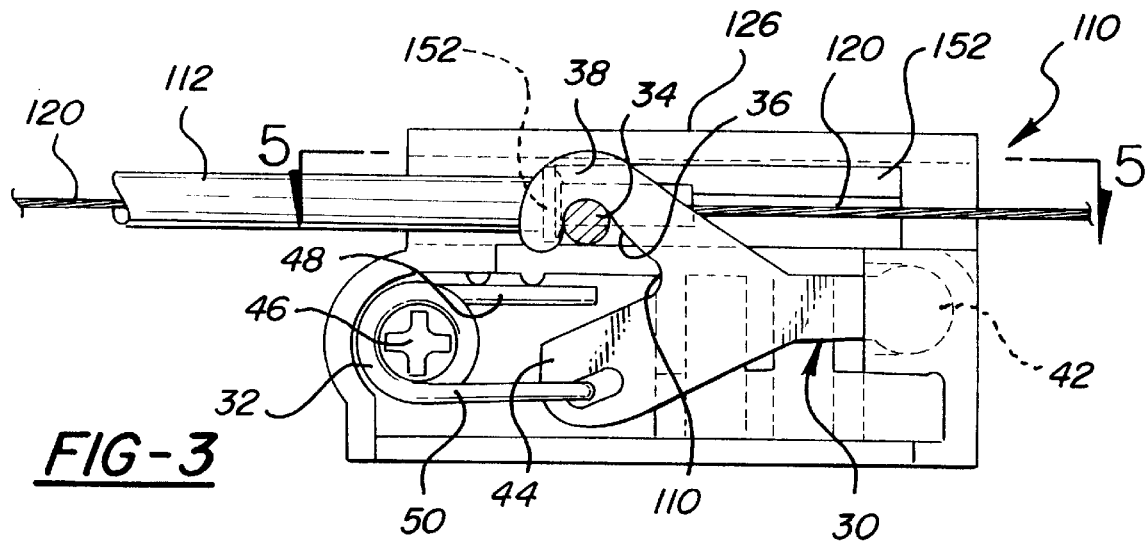
FIG. 3 is a side view, partially in cross section, of a second embodiment showing the fully extended position.
Figure 4:
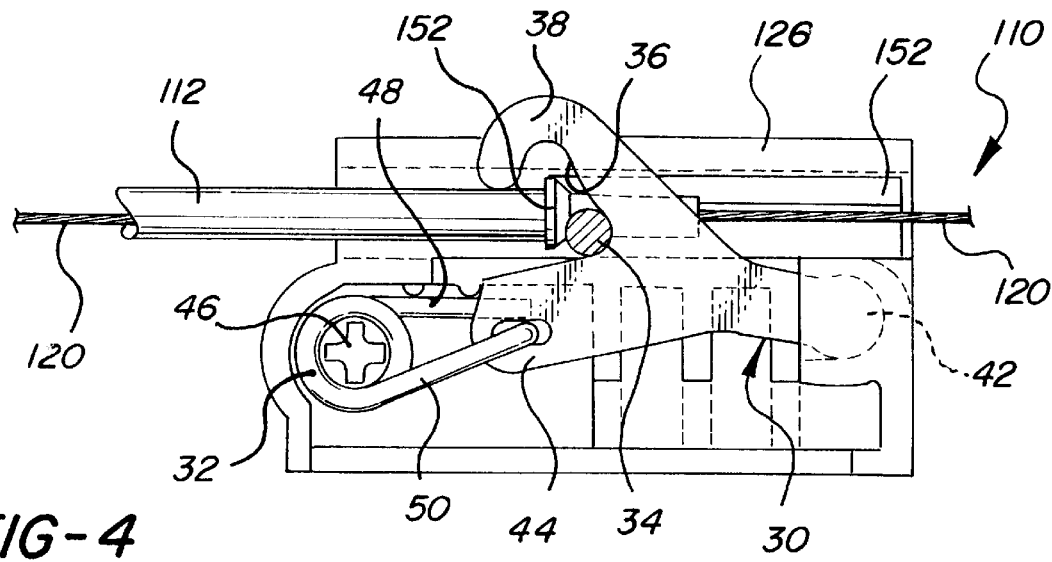
FIG. 4 is a view like FIG. 3 but showing the fully retracted or minimum length position.

Referring to the Figures, wherein like numerals indicate like or corresponding parts throughout the several views, a first motion transmitting remote control assembly is generally shown at 10 in FIGS. 1 and 2 and a second motion transmitting remote control assembly is generally shown at 110 in FIGS. 3 and 4. As is well known in the art, such remote control assemblies comprise a flexible motion transmitting core element for transmitting motion along a curved path and a guide means for movably supporting the core element along a longitudinal axis. As alluded to above in the background of the invention, such assemblies also frequently include an adjustment means for allowing a change in the length of one of the core element and the guide means along the longitudinal axis thereof. The assembly 10 illustrated in FIGS. 1 and 2 facilitates the change in the overall length of the core element whereas the assembly 110 illustrated in FIGS. 3 and 4 facilitates the change in the overall length of the guide means, which thereby allows the effective length of the core element to change.

In the assembly 10 illustrated in FIGS. 1 and 2 the guide means is defined by conduit sections 12 and 14 having inner ends attached by fittings 16 to a housing 18 and outer ends (not shown) adapted by fittings or ferrules to be supported on vehicle structure. Of course, the inner ends of the conduit sections 12 and 14 may be integral with the housing 18 as when the housing 18 is molded of plastic about the inner ends of the conduit sections 12 and 14. The core element in the assembly 10 changes in the length by being divided into two parts 20 and 22 each with an inner end and with one 24 of the inner ends connected to a support member 26 and the other 28 of the inner ends connected to the adjustment means of the subject invention.

Figure 5:
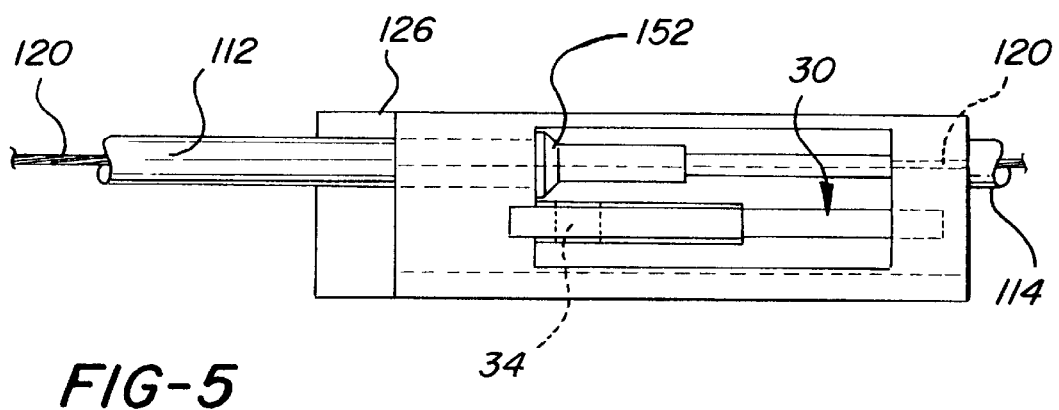
FIG. 5 is a view taken along line 5—5 of FIG. 3.

In the assembly 110 illustrated in FIGS. 3 and 4 the guide means is defined by a single conduit section 112 having an inner end attached to a slide fitting 152 and an outer end (not shown) adapted by fittings or ferrules to be supported on vehicle structure. The core element 120 in the assembly 110 is continuous between the outer ends of the assembly. In the assembly 110, the conduit 112 changes in length as it is slidably supported by a support member 126. Although only one section of conduit 112 is illustrated, the embodiment may employ a second section of conduit 114 secured to the support member 126, as illustrated in FIG. 5.

The assemblies are characterized by the adjustment means including a rotary member generally indicated at 30 and supported by each of the support members 26 and 126 at a support axis for rotation about the support axis in response to the change in the length. Each assembly includes a control member comprising a spring 32 interacting between the associated support member 26 or 126 and the rotary member 30 for controlling the rotation of the rotary member 30 relative to the support member 26 or 126.

A connection means, comprising a cam element 34 and a cam surface 36, coacts with the rotary member 30 for rotating the rotary member 30 in response to the change in the length. The cam element 34 and the cam surface 36 define first and second surfaces respectively which are in sliding engagement with one another as the cam element 34 moves rectilinearly along the longitudinal axis in response to the change in the length. The second surface, defined by the cam surface 36, is in the rotary member 30 and extends at an acute angle relative to the longitudinal axis.

The rotary member 30 defines a stop at each end of the cam surface 36 for limiting movement of the cam element 34 along the cam surface 36 to limit the change in the length. More specifically, one stop is defined by a hook 38 and the other stop is defined by a recess 40 in the rotary member 30.

The rotary member 30 is generally triangular in overall configuration. The rotary member 30 includes a first arm with a semi-spherical distal end 42 at one point of the triangle and rotatably supported in a spherical pocket in the support member 26 or 126. A second arm 44 defines the second point of the triangle for reacting with the spring 32. A third point of the triangle is defined by a third arm which includes the cam surface 36 and the stops 38 and 40, i.e., the hook 38.

A spring post 46 extending from the support member 26 or 126. The spring 32 comprises a torsion spring wound around the spring post 46 and includes a first arm 48 reacting with the support member 26 or 126 and a second arm 50 reacting with the rotary member 30.

In the assembly 10 of FIGS. 1 and 2, wherein the core element changes in the length by being divided into two parts 20 and 22 each with an inner end, one of the inner ends is connected to the support member 26 and the other of the inner ends connected to the cam element 34. More specifically, a slider member 52 is slidably supported by the support member 26 for rectilinear movement relative to the support member 26 along the longitudinal axis of the assembly. The inner end 24 of the core element section 20 includes a ball disposed in a pocket in the support member 26 so as to be anchored to the support member 26. The support member 26 is secured to the housing 18 to fix longitudinal movement of the core element section 20 relative to the housing 18. The inner end of the other core element section 22 also includes a ball and that ball is disposed in a pocket in the slider member 52 so as to move rectilinearly with the slider member 52 relative to the support member 26.

In the assembly 110 of FIGS. 3 and 4, the guide means, i.e., the conduit 112 as combined with the support member 126, changes in the length by being connected to the cam element 34 and longitudinally moveable relative to the support member 126. The conduit 112 is slidably supported by the support member 126. More specifically, the slider fitting 152 is rectilinearly slidably supported by the support member 126. The slider fitting 152 may be molded of plastic about the conduit 112. The cam element 34 is a pin which extends laterally from the slider fitting 152 to move rectilinearly parallel to the longitudinal axis of the assembly. The embodiment of FIGS. 3 and 4 differs from that of FIGS. 1 and 2 in that the core element sections 20 and 22 of the assembly 10 are at the maximum extended position when the cam element 34 is against the inner stop 40 and the full biasing action of the spring 32. On the other hand, the conduit 112 is at the minimum extended position when the cam element 34 is against the inner stop 40 and against the full biasing action of the spring 32, which allows the core element 120 to be at the maximum extended position. In the embodiment of FIGS. 1 & 2, the support member 26 is movable with the housing 18 whereas in the embodiment of FIGS. 3 & 4, there is no housing and the support member 126 is attached to support structure in the installed condition.

The invention therefore also presents a method for allowing a change in the length of one of a core element and a conduit supporting the core element along a longitudinal axis in a motion transmitting remote control assembly by comprising the steps of converting the change in length along the longitudinal axis to rotary motion, and controlling the rotary motion. The method may be further defined as controlling the rotary motion by applying a biasing force to resist the rotary motion. The method may also be further defined as employing a camming action to convert the change in length to rotary motion. FIGS. 1 and 3 show the invention in the steady state condition without forces applied longitudinally. On the other hand, FIGS. 2 and 4 show the invention in an operative state with forces applied longitudinally, i.e., the maximum extended length for the core element sections 20 and 22 and the minimum extended length of the conduit 112. In these operative positions, the cam element 34 leaves the hook 38 and is forced downwardly along the cam surface 36 thereby rotating the rotary member 30 clockwise about its spherical support axis 42. During this extending movement, the spring 32 resists rotation of the rotary member 30 thereby applying a biasing force against changing the overall length of the assembly. Of course, the spring may take various configurations among coil springs, leaf springs, tension springs, etc. The maximum rotation of the rotary member 30 is established by the cam element 34 engaging the stop defined by the hook 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10 and 110) comprising:

a flexible motion transmitting core element for transmitting motion;

a guide means for movably supporting said core element along a longitudinal axis; and adjustment means for allowing a change in the longitudinal length of two parts of one of said core element and said guide means along said longitudinal axis thereof;

said assembly characterized by said adjustment means including a support member (26, 126) and a rotary member (30) supported by said support member (26, 126) at a support axis for rotation about said support axis in response to said change in the length.

said support member (26, 126) being connected to one of said parts, said rotary member (30) presenting a cam surface (36) disposed at an acute angle relative to said longitudinal axis, a cam element (34) connected to the other of said parts and movable rectilinearly along said longitudinal axis to slide along said cam surface (36) in a wedging action to rotate said rotary member (30) in response to relative longitudinal movement between said parts to effect said change in length.

2. An assembly as set forth in claim 1 including a control member (32) interacting between said support member (26, 126) and said rotary member (30) for controlling said rotation of said rotary member (30) relative to said support member (26, 126).

3. An assembly as set forth in claim 2 wherein said control member (32) comprises a spring biasing said rotary member (30) to rotate about said support axis.

4. An assembly as set forth in claim 3 wherein said spring comprises a torsion spring.

5. An assembly as set forth in claim 4 including a spring post (46) extending from said support member (26, 126) and said torsion spring is wound around said spring post (46) and includes a first arm (48) reacting with said support member (26, 126) and a second arm (50) reacting with said rotary member (30).

6. An assembly as set forth in claim 2 wherein said rotary member (30) defines a stop (38, 40) at each end of said cam surface (36) for limiting movement of said cam element (34) along said cam surface (36) to limit said change in the length.

7. An assembly as set forth in claim 6 wherein said rotary member (30) includes a first arm (48) with a distal end rotatably supported by said support member (26, 126), a second arm (50) reacting with said control member (32), and a third arm defining said cam surface (36) and said stops (38, 40).

8. An assembly as set forth in claim 7 wherein said control member (32) comprises a spring biasing said rotary member (30) to rotate about said support axis.

9. An assembly as set forth in claim 8 wherein said spring comprises a torsion spring.

10. An assembly as set forth in claim 9 including a spring post (46) extending from said support member (26, 126) and said torsion spring is wound around said spring post (46) and includes a first arm (48) reacting with said support member (26, 126) and a second arm (50) reacting with said rotary member (30).

* * * * *